UNITED STATES PATENT OFFICE.

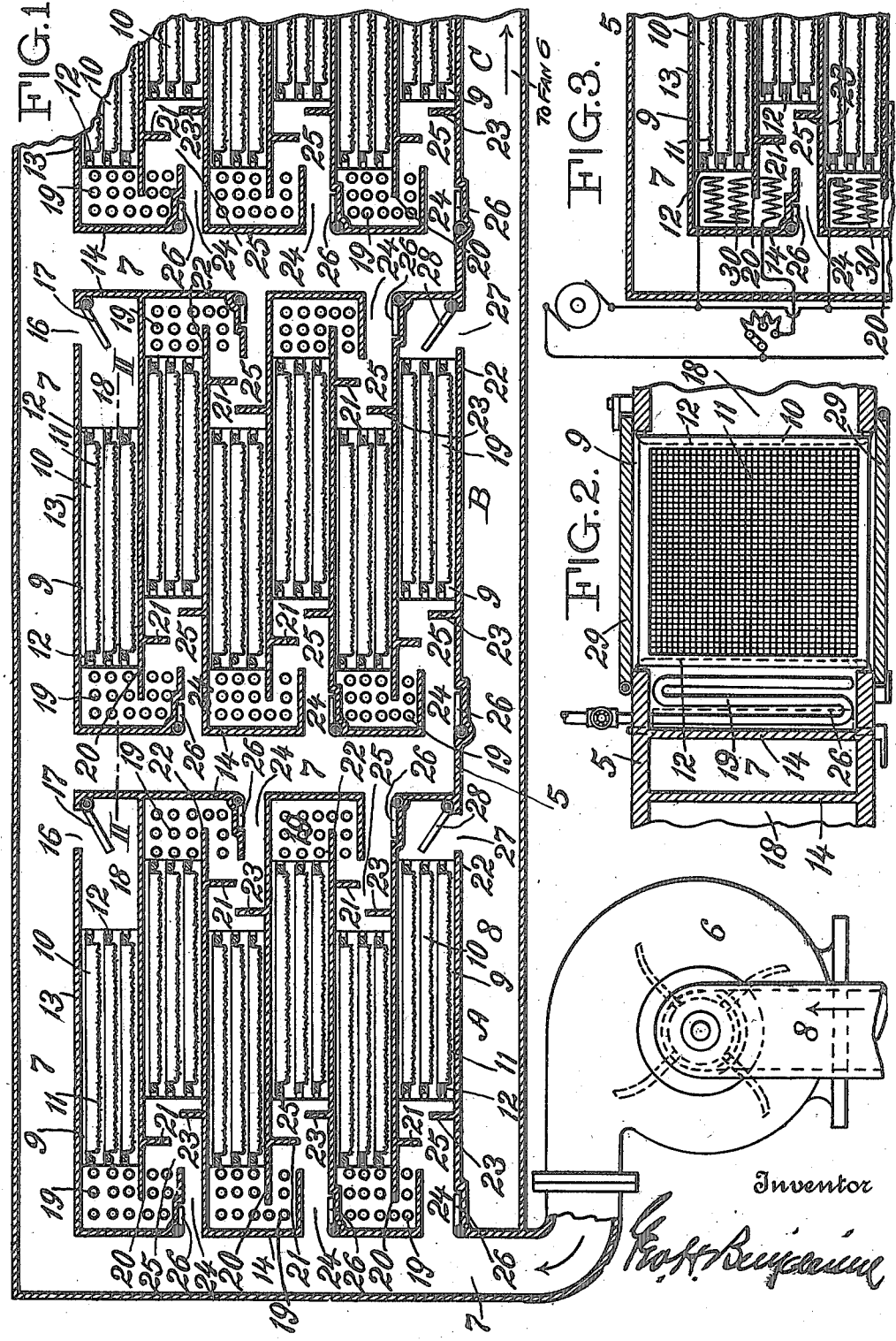

GEORGE HILLARD BENJAMIN, OF NEW YORK, N. Y.

METHOD OF AND APPARATUS FOR DEHYDRATING FRUITS, VEGETABLES, AND SIMILAR ARTICLES.

1,264,600.            Specification of Letters Patent.       Patented Apr. 30, 1918.

Application filed July 10, 1917. Serial No. 179,643.

*To all whom it may concern:*

Be it known that I, GEORGE HILLARD BENJAMIN, a citizen of the United States, residing at New York, in the county and State of New York, have invented certain new and useful Improvements in Methods of and Apparatus for Dehydrating Fruits, Vegetables, and Similar Articles, of which the following is a specification.

My invention relates to a method of and apparatus for dehydrating fruits, vegetables and similar articles.

The object of my invention is to accomplish quick and uniform drying of the articles under treatment.

Dehydration of fruits, vegetables and similar articles is usually accomplished by sending a current of warm air, containing more or less water, over the article to be dehydrated thereby causing exudation of moisture from the article and the absorption of such moisture by the moving air current. Manifestly, if an air current containing say 50% of moisture, is passed over an article, and the air current absorbs moisture, the percentage of moisture will be increased say to 70%. If now this air current, containing 70%, is sent over another similar article, its moisture absorbing capacity is decreased, for two reasons: First, because the amount of moisture in the air current has been increased, and second, because its temperature has been decreased, thereby reducing its absorbing capacity per unit.

Ordinarily, air used in dehydrating, is caused to pass once over the entire body of the article to be dehydrated, and then emitted into the atmosphere; or the whole body of air may be given an initial temperature and then, as described in my prior Patent No. 1,225,211, dated May 8, 1917, a portion of such air boosted to a required temperature, before being passed over the article.

Economically, it is desirable that the air used in dehydration should be passed over the article to be dehydrated a number of times, and that the temperature and absorbing value of the air shall be the same at each transmission. The temperature of the air can be maintained by boosting, that is, adding additional heat units to compensate for the loss occurring in each passage over the article treated, and the absorbing value of the air transmitted can be maintained by increasing the volume of the air directly in proportion to its absorption of moisture by the air.

To accomplish the above last stated result, I have designed the apparatus illustrated in the accompanying drawings, in which Figure 1 is a vertical section.

Fig. 2 is a horizontal section looking downward on the line II—II of Fig. 1.

Fig. 3 is a section corresponding to Fig. 1, showing a modified method of boosting the air.

Referring to the drawings: 5 indicates a casing, which may be formed of any suitable non-conducting material or materials. 6, a pump through which air is discharged into an air trunk 7. 8, an exhaust trunk connected to the inlet of the pump 6. Situated between the air trunk 7 and exhaust trunk 8, are dehydrating cells 9. Three such cells are shown, marked respectively, A, B, C. Two cells, A and B are supposed to form one unit. These cells are adapted to contain a series of trays 10 having perforated bottoms 11 supported in guides 12. These trays are shown arranged in groups of three, one group above the other and in staggered relation.

Surrounding the whole of the trays 10 is a casing having a top member 13, side members 14 and bottom member 15, the latter of which forms a part of the top of the exhaust trunk 8. The top member 13 has formed therein an opening 16, in which is a valve 17, designed to control the size of the opening. The opening 16 leads into a space 18 situated at one end of each group of trays. Located at the other end of each group of trays are a series of steam pipes or other form of heating device 19. Separating the respective groups of trays are horizontal partitions 20—22. The partitions 20 are respectively located between the first and second, third and fourth and fifth and sixth groups of cells, and the partitions 22 are respectively located between the second and third and the fourth and fifth groups of cells, and form the bottom of the sixth group of cells and the top of exhaust air trunk 8. The partitions 20—22 generally have projections 23 extending upwardly and 21 extending downwardly.

The side members 14 have formed in them, openings 24 leading into spaces 25, and these openings are provided with valves 26, designed to control the size of the openings 24. The bottom partition 22 has an opening 27 leading into exhaust trunk 8, and this opening 27 is provided with a valve 28, designed to control the size of the opening 27. 29 are doors through which the trays 10 may be introduced or withdrawn from the cells 9.

The operation of my improved device is as follows: Air from the pump 6 passes up air trunk 7 through opening 16 of the respective cells A, B, C, into a space 18, thence horizontally over the first group of trays, then over the steam pipes 19 and into the space 25. Simultaneously, air is introduced through an opening 24. The plates 21 and 23 act as baffles to mix the air introduced through openings 16 and 24.

It is assumed that the air passing over the steam pipes 19 will heat it and boost it to the temperature of the air introduced through the air trunk 7, and that the heated air introduced through the opening 24 will increase the volume of air in proportion to the increase of humidity in the air introduced through the opening 16. The whole body of air then passes over the second group of trays to be again heated, and air introduced as before, and so on through the different groups of trays until finally discharged into the exhaust air trunk 8 through the opening 27, which is controlled by valve 28.

In place of using steam heated pipes such as 19, I may use electric coils such as shown at 30 (Fig. 3). The temperature of the air as it flows from one group of trays to the next, can be controlled by the temperature of the steam in the steam pipes, or the quantity of current transmitted through the electric coils.

I have shown my improved device as embodying six groups of superposed trays. Manifestly the number of groups may be increased or decreased. Preferably, the number of groups should be such that with a body of air given a definite and maintained temperature in passing all the groups, the air will be saturated with moisture when it is emitted into the exhaust trunk.

It will be understood without description or drawing that the air received through the exhaust trunk can be carried through any suitable apparatus such for instance as is shown in my prior Patent No. 1,220,815 dated March 27, 1917, to remove any absorbed moisture in excess of that normal to the air, after which the air may be heated to the original temperature and again sent through the apparatus.

Having thus described my invention, I claim:

1. The method of drying described, which consists in supplying air having a determined temperature and humidity, passing said air over a portion of the article to be treated, then heating said air to restore it to its initial temperature, then mixing said air with a fresh body of air, then transmitting said mixed bodies of air over a second portion of the article to be treated, and repeating such steps over successive portions of the article until the whole article has been subjected to the action of the air currents.

2. The method of drying described, which consists in supplying air having a determined temperature and humidity, passing said air over a portion of the article to be treated, then heating said air to restore it to its initial temperature, then mixing said air with a fresh body of air, the fresh body of air being in amount approximately proportional to the increased humidity of the original body of air, then transmitting said mixed bodies of air over a second portion of the article to be treated, and repeating such steps over successive portions of the article until the whole article has been subjected to the action of the air currents.

3. The method of drying described, which consists in supplying air having a determined temperature and humidity, passing said air successively over portions of the article to be treated, adding heat to restore the original temperature of the air, and additional air to approximately restore the absorbing value of the air, after passing the first portion of the article to be treated and before passing the successive portions.

4. The method of drying described, which consists in subjecting the article to be treated to the successive action of air currents having a maintained temperature and approximately maintained moisture absorbing capacity.

5. In an apparatus of the type described, the combination of an air inlet trunk, an air outlet trunk, a series of cells, each cell consisting of a series of superposed separated groups of trays, means for feeding air to one end of each group of trays, means for boosting the temperature of the air after passing each group of trays, together with means for introducing additional air into the boosted air currents before passing successive groups of trays.

6. In an apparatus of the type described, the combination of an air inlet trunk, an air outlet trunk, a series of cells, each cell consisting of a series of superposed separated groups of trays in staggered relation, means for feeding air to one end of each group of trays, means for boosting the temperature of the air after passing each group of trays, together with means for introducing additional air into the boosted air currents before passing successive groups of trays.

7. In an apparatus of the type described, the combination of an air inlet trunk, an air outlet trunk, a series of cells, each cell containing a series of superposed separated groups of trays, and means in the line of travel of the air through the successive groups of trays, for effecting a mixture of the originally introduced air and additional air, before such mixed air is passed through each successive group of trays.

8. In an apparatus of the type described, the combination of a pump, an air inlet trunk connected to the outlet of the pump, an air outlet trunk, a series of cells interposed between the air inlet and the air outlet trunk, a series of groups of removable trays located in superposed separated staggered relation in said cells, means for feeding air over said trays, means for adding heat to the air after leaving one series of trays and before passing over the next series of trays, means for introducing additional air and mixing it with the first named body of air before passing said mixed body of air over successive groups of trays, together with means for regulating the volume of the air current and the temperature of such air current during the passage of said air current through the cells.

In testimony whereof, I affix my signature, in the presence of two witnesses.

GEORGE HILLARD BENJAMIN.

Witnesses:
 HELEN E. KOELSCH,
 LESTER BEARDSLEY.